(12) United States Patent
Berner

(10) Patent No.: US 12,255,428 B2
(45) Date of Patent: Mar. 18, 2025

(54) POWER TRANSFER SYSTEMS FOR MOVABLE PRIVACY GLAZING STRUCTURES

(71) Applicant: Cardinal IG Company, Eden Prairie, MN (US)

(72) Inventor: Eric Berner, Ramsey, MN (US)

(73) Assignee: Cardinal IG Company, Eden Prairie, MN (US)

( * ) Notice: Subject to any disclaimer, the term of this patent is extended or adjusted under 35 U.S.C. 154(b) by 286 days.

(21) Appl. No.: 17/847,499

(22) Filed: Jun. 23, 2022

(65) Prior Publication Data

US 2022/0416491 A1 Dec. 29, 2022

Related U.S. Application Data

(60) Provisional application No. 63/214,136, filed on Jun. 23, 2021.

(51) Int. Cl.
*G02F 1/133* (2006.01)
*E05D 13/00* (2006.01)
(Continued)

(52) U.S. Cl.
CPC ....... *H01R 35/025* (2013.01); *E05D 13/1276* (2013.01); *E06B 9/24* (2013.01);
(Continued)

(58) Field of Classification Search
CPC .. G02F 1/133; G02F 1/1333; G02F 1/133365; G02F 1/1334; G02F 1/1335; G02F 1/1343; E05D 13/1276; E05D 15/16; E05D 11/0081; E05D 2015/485; E05Y 2201/47; E05Y 2201/482; E05Y 2400/65; E05Y 2400/656; E05Y 2400/658;
(Continued)

(56) References Cited

U.S. PATENT DOCUMENTS

| | | | |
|---|---|---|---|
| 1,551,332 A | 8/1925 | Schramm | |
| 1,744,040 A | 1/1930 | Elzer | |

(Continued)

FOREIGN PATENT DOCUMENTS

| | | | |
|---|---|---|---|
| DE | 9419315 U1 | 4/1995 | |
| DE | 29922648 U1 | 3/2000 | |

(Continued)

OTHER PUBLICATIONS

International Patent Application No. PCT/US2022/034653, International Search Report and Written Opinion mailed Dec. 13, 2022, 18 pages.

(Continued)

*Primary Examiner* — Thoi V Duong
(74) *Attorney, Agent, or Firm* — Fredrikson & Byron, P.A.

(57) ABSTRACT

A power transfer assembly includes a window balance assembly, a pivot bar, and an electrically conductive pathway. The window balance assembly includes a first portion configured to be fixed in place and a second portion configured to be movable relative to the first portion. The pivot bar is conductively coupled to the second portion of the window balance assembly. And, the electrically conductive pathway extends between the window balance assembly and the pivot bar.

12 Claims, 10 Drawing Sheets

(51) Int. Cl.
*E06B 9/24* (2006.01)
*G02F 1/1333* (2006.01)
*G02F 1/1334* (2006.01)
*G02F 1/1335* (2006.01)
*G02F 1/1343* (2006.01)
*H01R 35/02* (2006.01)
*H01R 41/00* (2006.01)

(52) U.S. Cl.
CPC ............ *G02F 1/133* (2013.01); *G02F 1/1334* (2013.01); *H01R 41/00* (2013.01); *E05Y 2201/482* (2013.01); *E05Y 2800/10* (2013.01); *E05Y 2900/148* (2013.01); *E06B 2009/2464* (2013.01)

(58) Field of Classification Search
CPC ........... E05Y 2800/10; E05Y 2900/132; E05Y 2900/148; E06B 2009/2464; E06B 9/24; H01R 35/025; H01R 41/00
See application file for complete search history.

(56) References Cited

U.S. PATENT DOCUMENTS

| | | | |
|---|---|---|---|
| 3,355,695 A | 11/1967 | Overesch | |
| 3,508,361 A | 4/1970 | Ryder | |
| 3,659,063 A | 4/1972 | Peterson | |
| 3,842,386 A | 10/1974 | Suska | |
| 3,848,361 A | 11/1974 | Foster et al. | |
| 3,857,625 A | 12/1974 | Crane et al. | |
| 3,860,312 A | 1/1975 | Gordon, Jr. | |
| 4,116,514 A | 9/1978 | Lawrence | |
| 4,140,357 A | 2/1979 | Wolz et al. | |
| 4,412,711 A | 11/1983 | Suska | |
| 4,445,299 A | 5/1984 | Lehikoinen et al. | |
| 4,671,582 A | 6/1987 | Stromquist et al. | |
| 4,839,939 A | 6/1989 | O'Brien | |
| 5,267,866 A | 12/1993 | Swift et al. | |
| 5,581,944 A | 12/1996 | Kombrekke et al. | |
| 5,586,895 A | 12/1996 | Zehrung | |
| 5,690,501 A | 11/1997 | Mader | |
| 5,717,380 A | 2/1998 | Zehrung | |
| 5,727,960 A | 3/1998 | Zehrung | |
| 6,401,399 B1 | 6/2002 | Roche et al. | |
| 6,581,332 B1 | 6/2003 | Kim | |
| 6,812,407 B1 | 11/2004 | Opperman | |
| 6,865,848 B2 | 3/2005 | Krimmel | |
| 7,085,609 B2 | 8/2006 | Bechtel et al. | |
| 7,259,359 B2 | 8/2007 | Davey et al. | |
| 7,661,960 B2 | 2/2010 | Tanoi et al. | |
| 8,448,382 B2 | 5/2013 | Rodgers et al. | |
| 8,650,714 B2 | 2/2014 | Staude | |
| 8,683,745 B2 | 4/2014 | Artwohl et al. | |
| 9,019,588 B2 | 4/2015 | Brown et al. | |
| 9,052,536 B2 | 6/2015 | Artwohl et al. | |
| 9,155,405 B2 | 10/2015 | Artwohl et al. | |
| 9,504,338 B2 | 11/2016 | Artwohl et al. | |
| 9,825,443 B2 | 11/2017 | Shah et al. | |
| 9,894,717 B2 | 2/2018 | Ash, Jr. et al. | |
| 9,920,560 B2 | 3/2018 | Gipson et al. | |
| 9,970,224 B2 | 5/2018 | Gompper et al. | |
| 10,175,549 B2 * | 1/2019 | Brown | E06B 7/28 |
| 10,563,440 B2 | 2/2020 | Kellum et al. | |
| 2014/0021903 A1 | 1/2014 | Seiling | |
| 2014/0259524 A1 | 9/2014 | Kellum, III | |
| 2016/0138317 A1 | 5/2016 | deNormand | |
| 2016/0344148 A1 | 11/2016 | Mullins et al. | |
| 2017/0170776 A1 | 6/2017 | Janowski | |
| 2017/0250163 A1 | 8/2017 | Wilbur et al. | |
| 2018/0307111 A1 | 10/2018 | Le Houx et al. | |
| 2019/0137796 A1 | 5/2019 | Bjergaard et al. | |
| 2019/0346710 A1 | 11/2019 | Schleder et al. | |
| 2021/0010308 A1 | 1/2021 | Baker et al. | |
| 2022/0035192 A1 | 2/2022 | Berner et al. | |

FOREIGN PATENT DOCUMENTS

| | | |
|---|---|---|
| DE | 202007009093 U1 | 9/2007 |
| EP | 2264351 A1 | 12/2010 |
| GB | 1096733 A | 12/1967 |
| KR | 1020200067415 A | 6/2020 |

OTHER PUBLICATIONS

Alvelid et al., "Development of a Concealed Power and Signal Transfer System for Sliding Doors," Master Thesis, Lund University, Department of Design Sciences, 2019, 111 pages.

* cited by examiner

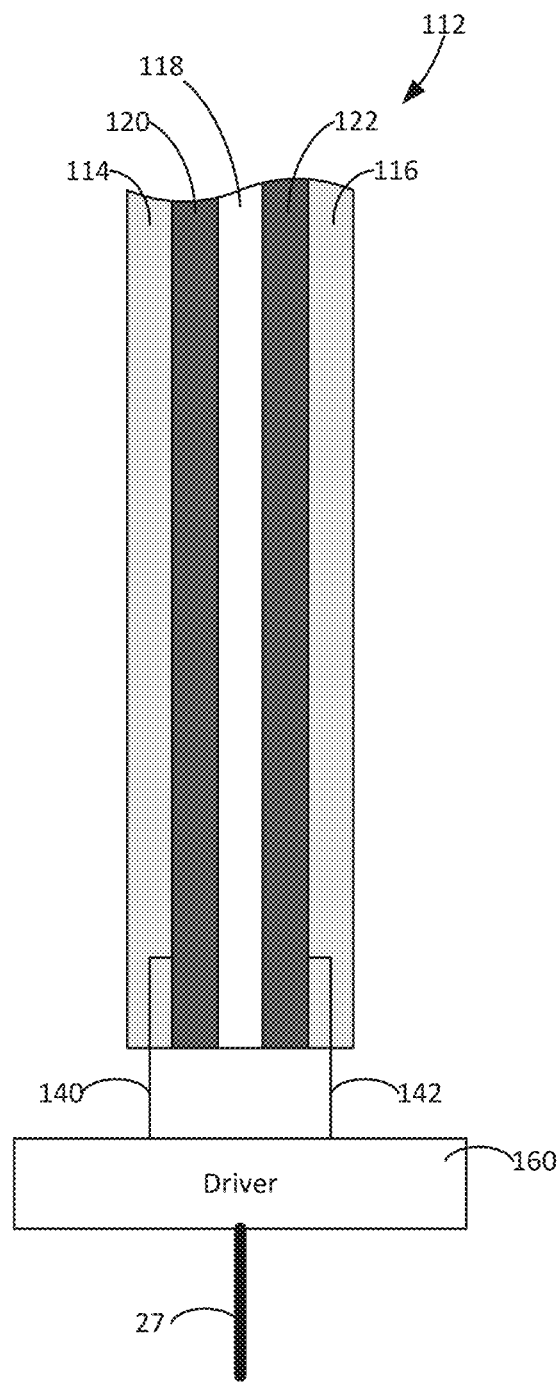
Fig—8

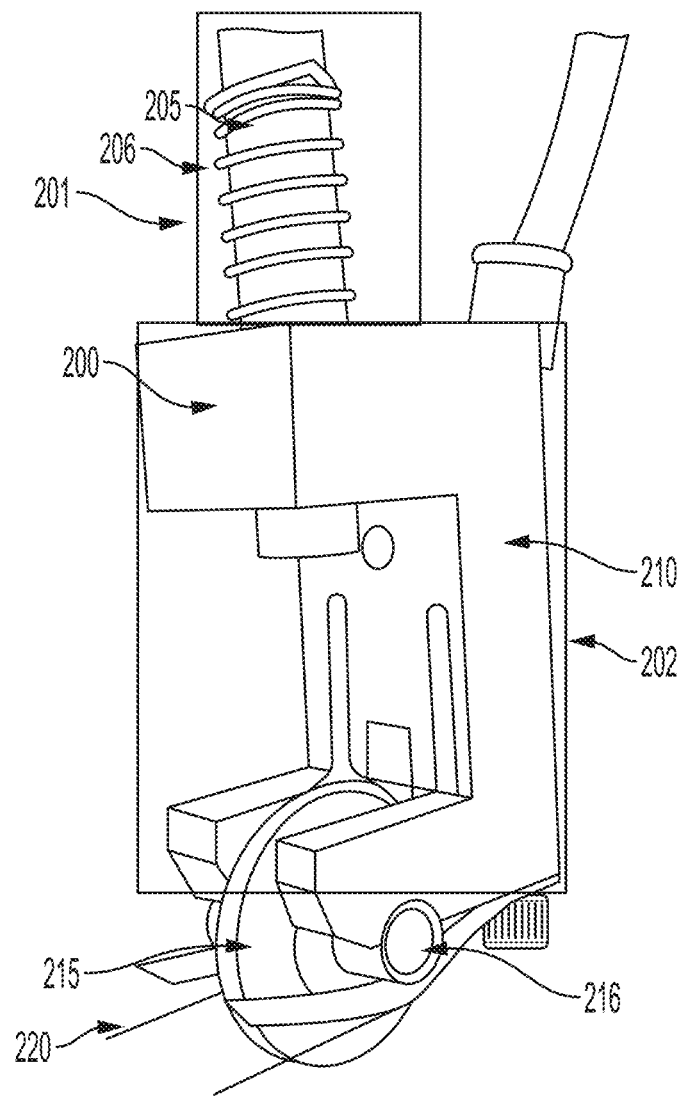
Fig—9A

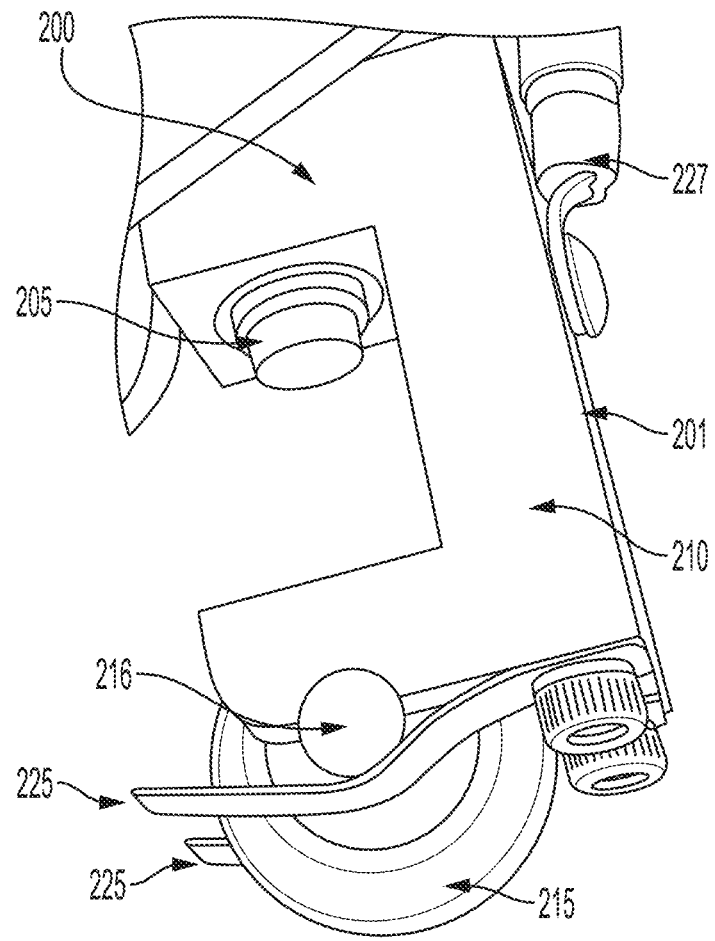
Fig—9B

POWER TRANSFER SYSTEMS FOR MOVABLE PRIVACY GLAZING STRUCTURES

CROSS REFERENCE

This application claims the benefit of U.S. Provisional Patent Application No. 63/214,136, filed Jun. 23, 2021, the entire contents of which are incorporated herein by reference.

TECHNICAL FIELD

This disclosure relates to power transfer configurations for supplying power from an energy source to a powered component, such as a privacy glazing structure containing an electrically controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In practice, an electrically controllable optically active structure may be installed and connected to an energy source to provide power for controlling the structure. Certain structures, such as doors and windows, are designed with one or more movable panes relative to a surrounding stationary frame. It can be challenging to provide power to these structures because the portion of the structure to which power is supplied is not fixed but instead moves as the structure is opened and closed.

SUMMARY

In general, this disclosure is directed to power transfer configurations for supplying power from an energy source to a powered component. In some examples disclosed herein, the powered component can be a privacy glazing structure and/or a component thereof. In operation, power transfer configurations disclosed herein can, for instance, be used to provide power for controlling an electrically controllable optically active material at the privacy glazing structure.

The privacy structures can be implemented in the form of a window, door, skylight, interior partition, or yet other structure where controllable visible transmittance is desired. Many such privacy structure implementations can include a movable privacy glazing structure, for instance, a window or door that slides between open and closed positions. Supplying power from an energy source to a movable privacy glazing structure can involve additional considerations, including, for example, how to supply power to the movable privacy glazing structure in each of its positions as well as how to supply power to the movable privacy glazing structure as it moves from one position to another. Moreover, the configuration used to supply power to the movable privacy glazing structure should not prevent the movable privacy glazing structure from moving between its various positions.

Power transfer assembly embodiments disclosed herein can be useful to supply power from an energy source to a movable privacy glazing structure. For example, certain power transfer assembly embodiments disclosed herein can make use of one or more components that are configured to facilitate, at least in part, movement of the movable privacy glazing structure while also supply power from the energy source to the privacy glazing structure.

As one example, a window balance assembly can be used to assist in movement of a movable privacy window. Certain power transfer assembly embodiments disclosed herein can include features that configure at least a portion of the window balance assembly to form an electrically conductive pathway between the energy source and the movable privacy window. In this way, the power transfer assembly can configure the window balance assembly to, at least in part, supply power to the movable privacy window and, thereby, facilitate controlled optical transmission at the movable privacy window.

As another example, a roller can be used to assist in movement of a movable privacy door. Certain power transfer assembly embodiments disclosed herein can include features that configure at least a portion of the roller to form an electrically conductive pathway between the energy source and the movable privacy door. In this way, the power transfer assembly can configure the roller to, at least in part, supply power to the movable privacy door and, thereby, facilitate controlled optical transmission at the movable privacy door.

One embodiment includes a power transfer assembly. The power transfer assembly may include a window balance assembly, a pivot bar, and an electrically conductive pathway. The window balance assembly may include a first portion configured to be fixed in place and a second portion configured to be movable relative to the first portion. The pivot bar may be conductively coupled to the second portion of the window balance assembly. The electrically conductive pathway can extend between the window balance assembly and the pivot bar.

In a further embodiment of the power transfer assembly, the electrically conductive pathway may be between the first portion of the window balance assembly, the second portion of the window balance assembly, and the pivot bar. The first portion of the window balance assembly can include an electrically conductive material, and the second portion of the window balance assembly can include an electrically conductive material. The electrically conductive material of the first portion of the window balance assembly can be conductively coupled to the electrically conductive material of the second portion of the window balance assembly. The electrically conductive material of the second portion of the window balance assembly can include an electrically conductive receiver and one or more electrically conductive contacts. The electrically conductive receiver can be configured to couple to the pivot bar to conductively couple the pivot bar to the second portion of the window balance assembly. The one or more electrically conductive contacts can be configured to be in electrical connection with the electrically conductive receiver. The window balance assembly can include a curl spring having an uncurled end portion and a curled portion, where the first portion of the window balance assembly can include the uncurled end portion and the second portion of the window balance assembly can include the curled portion. The one or more electrically conductive contacts can be in conductive contact with the curled portion so as to conductively couple the uncurled end portion to the electrically conductive receiver.

In a further embodiment of the power transfer assembly, the second portion of the window balance assembly can include a carrier housing and an electrically conductive receiver supported at the carrier housing. The electrically conductive receiver can be configured to rotate relative to the carrier housing, and the pivot bar can be conductively coupled to the electrically conductive receiver. The electrically conductive receiver can include a body that defines a first complementary fitting that is electrically conductive. The pivot bar can include a body that defines a second complementary fitting that can be electrically conductive. The first complementary fitting can be configured to couple to the second complementary fitting to conductively couple the pivot bar to the second portion of the window balance assembly.

In a further embodiment, the power transfer assembly may additionally include a conductive line. The conductive line can include a first end portion and a second end portion that is opposite the first end portion. The first end portion of the conductive line may be conductively coupled to the pivot bar and the second end portion of the conductive line can be configured to conductively couple to a powered component associated with a window assembly. The conductive line can be conductively coupled to the first portion of the window balance assembly via the second portion of the window balance assembly and the pivot bar.

In a further embodiment of the power transfer assembly, the electrically conductive pathway between the window balance assembly and the pivot bar may include, at the second portion of the window balance assembly, an electrically conductive receiver and one or more electrically conductive contacts. The electrically conductive receiver can be configured to conductively couple to the pivot bar and rotate with the pivot bar. The one or more electrically conductive contacts can be configured to conductively couple to each of the first portion of the window balance assembly and the electrically conductive receiver.

Another embodiment includes an electrically dynamic system. This electrically dynamic system embodiment may include a first pane of transparent material, a second pane of transparent material, an electrically controllable optically active material, and a power transfer assembly. The electrically controllable optically active material is positioned between the first pane of transparent material and the second pane of transparent material, and the electrically controllable optically active material is positioned between a first electrode layer and a second electrode layer. The power transfer assembly may include a window balance assembly, a pivot bar, and an electrically conductive pathway. The window balance assembly can include a first portion configured to be fixed in place, relative to at least one of the first pane and the second pane, and a second portion configured to be movable relative to the first portion. The pivot bar can be conductively coupled to the second portion of the window balance assembly. The electrically conductive pathway can extend between the window balance assembly and at least one of the first electrode layer and the second electrode layer.

In a further embodiment of the electrically dynamic system, the electrically conductive pathway may be between the first portion of the window balance assembly, the second portion of the window balance assembly, the pivot bar, and at least one of the first electrode layer and the second electrode layer. The first portion of the window balance assembly can include an electrically conductive material, and the second portion of the window balance assembly can include an electrically conductive material. The electrically conductive material of the first portion of the window balance assembly can be conductively coupled to the electrically conductive material of the second portion of the window balance assembly. The electrically conductive material of the second portion of the window balance assembly can include an electrically conductive receiver and one or more electrically conductive contacts. The electrically conductive receiver can be configured to couple to the pivot bar to conductively couple the pivot bar to the second portion of the window balance assembly. The one or more electrically conductive contacts can be configured to be in electrical connection with the electrically conductive receiver. The window balance assembly can include a curl spring having an uncurled end portion and a curled portion. The first portion of the window balance assembly can include the uncurled end portion and the second portion of the window balance assembly can include the curled portion. The one or more electrically conductive contacts can be in conductive contact with the curled portion so as to conductively couple the uncurled end portion to the electrically conductive receiver.

In a further embodiment of the electrically dynamic system, the power transfer assembly further may include a conductive line. The conductive line can include a first end portion and a second end portion that is opposite the first end portion. The first end portion of the conductive line may be conductively coupled to the pivot bar, and the second end portion of the conductive line may be conductively coupled to the at least one of the first electrode layer and the second electrode layer. In some implementations, the electrically dynamic system can also include a driver. The driver can be electrically connected to the first electrode layer, the second electrode layer, and the conductive line. The driver can be configured to receive power from the conductive line, convert the received power to a drive signal, and provide the drive signal to the first electrode layer and the second electrode layer for controlling the electrically controllable optically active material.

In a further embodiment of the electrically dynamic system, the conductive pathway between the window balance assembly and the at least one of the first electrode layer and the second electrode layer may include, at the second portion of the window balance assembly, an electrically conductive receiver and one or more electrically conductive contacts. The electrically conductive receiver can be configured to conductively couple to the pivot bar and rotate with the pivot bar. The one or more electrically conductive contacts may be configured to conductively couple to each of the first portion of the window balance assembly and the electrically conductive receiver.

In some embodiments of the electrically dynamic system, the first pane of transparent material, the second pane of transparent material, and the electrically controllable optically active form a privacy glazing structure. The privacy glazing structure can be movable relative to the first portion of the window balance assembly.

The details of one or more examples are set forth in the accompanying drawings and the description below. Other

BRIEF DESCRIPTION OF DRAWINGS

FIG. 8 is a schematic illustration showing an example connection arrangement of a conductive line to a driver and the driver to electrode layers of the privacy glazing structure of FIG. 6.

FIGS. 9A and 9B show an embodiment of a roller that can be used as part of a power transfer assembly. FIG. 9A is a perspective view of a schematic illustration of the roller, and FIG. 9B is a perspective view of the roller of FIG. 9A with the housing removed.

DETAILED DESCRIPTION

In general, the present disclosure is directed to power transfer devices, systems incorporating power transfer devices, and associated methods of transferring power. For example, power transfer embodiments disclosed herein can supply power from an energy source to a powered component. In some embodiments disclosed herein, the powered component can be, or include a part of, a privacy glazing structure. Power transfer embodiments disclosed herein can, for instance, be used to provide power for controlling an electrically controllable optically active material at the privacy glazing structure.

In some implementations discussed in greater detail below, power transfer assembly embodiments disclosed herein can be useful in supplying power from an energy source to a movable privacy glazing structure. For instance, certain power transfer assembly embodiments disclosed herein can make use of one or more components that are configured to facilitate, at least in part, movement of the movable privacy glazing structure to also supply power from the energy source to the privacy glazing structure. Power transfer assembly embodiments disclosed herein can include features that configure at least a portion of one or more components that facilitate movement of the movable privacy glazing structure to form an electrically conductive pathway between the energy source and the movable privacy glazing structure. In this way, these power transfer assembly embodiments can configure the one or more components that facilitate movement of the movable privacy glazing structure to, at least in part, be able to supply power to the movable privacy glazing structure and, thereby, can help to facilitate controlled optical transmission at the movable privacy glazing structure.

For instance, in one example, the power transfer assembly includes one or more electrified window balancers. In general, a window balance is a mechanism that allows a window (e.g., a single-hung window, double-hung window) to open and close smoothly. The balancer made include a spring member (e.g., compression spring, extension spring, coil spring) that counters the force of gravity and holds the sash of the window unit in place relative to the surrounding frame (when opened to a desired position). In some examples, the window balancer defines an electrically conductive pathway between a power source and an electrically controllable optically active material in the window. The window balancer may function to electrically and/or mechanically couple the movable portion of the window carrying the electrically controllable optically active material to and/or through the surrounding frame. This can allow the movable portion to remain electrically connected to a power source at any desired position and/or through a range of travel.

Figure 1:
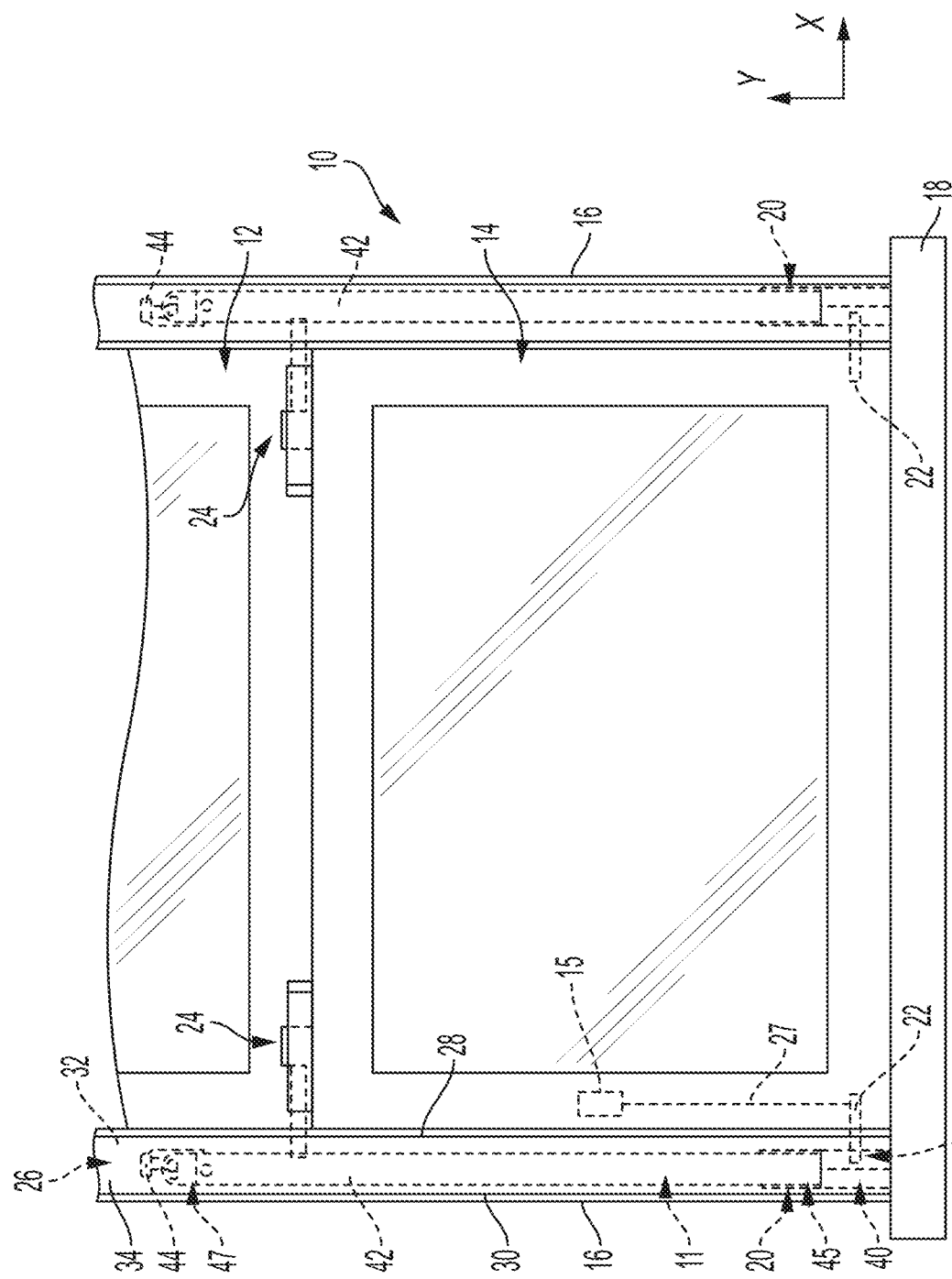
FIG. 1 is a partial schematic front view of an embodiment of a window assembly including an embodiment of a power transfer assembly.
Figure 2:
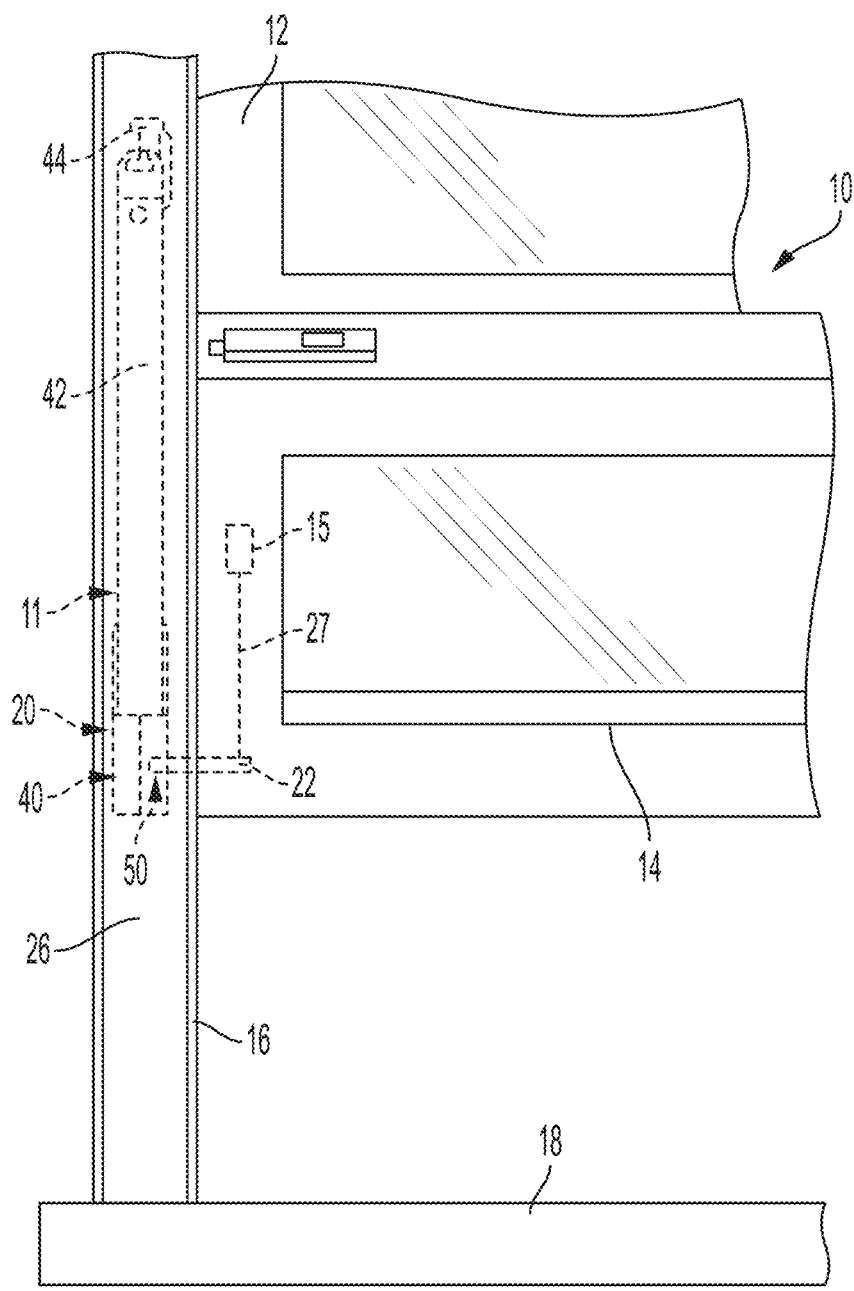
FIG. 2 is a partial schematic front view of the window assembly of FIG. 1 showing a raised and tiled window sash.
Figure 3:
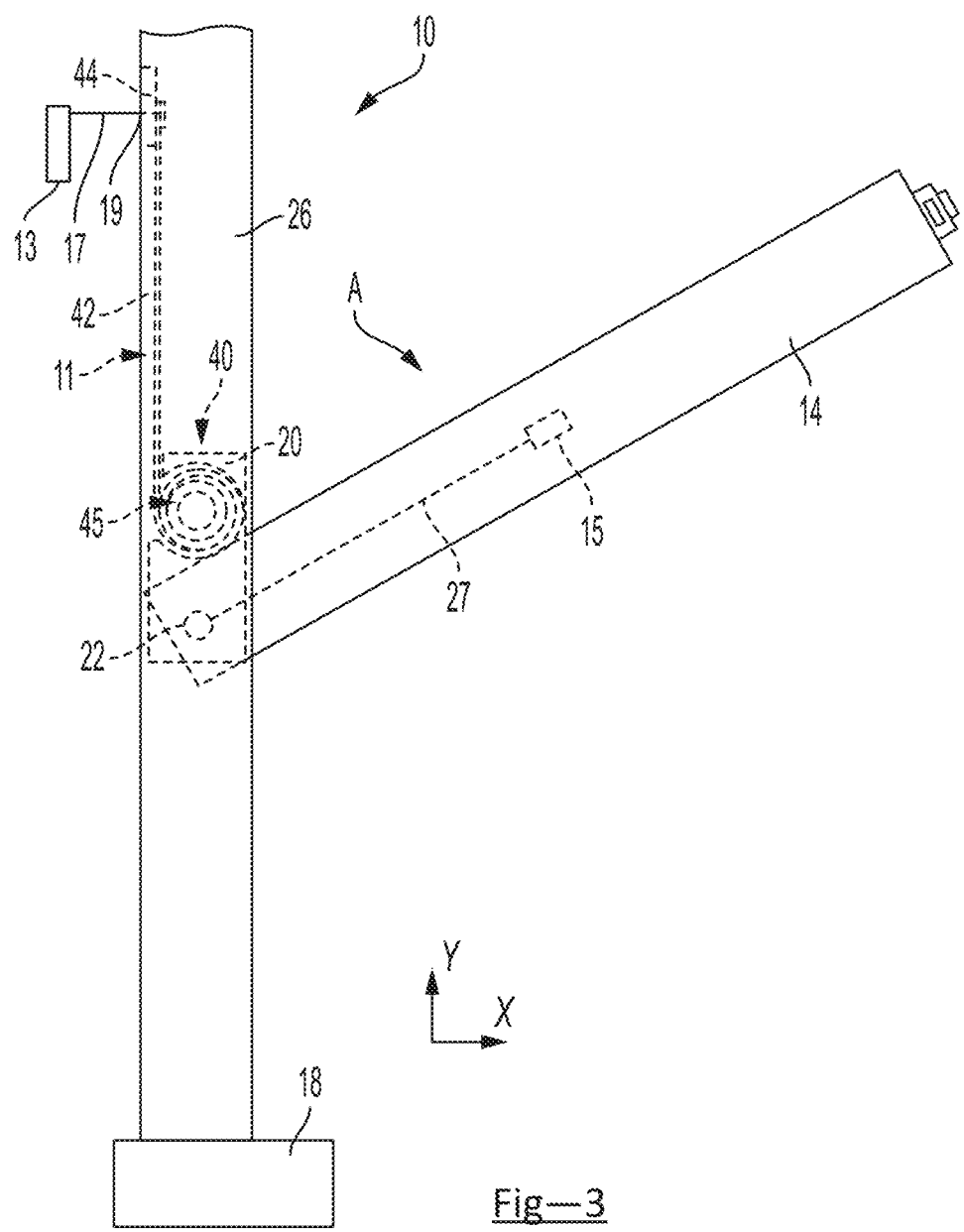
FIG. 3 is a partial schematic side view of the window assembly of FIG. 2.

FIGS. 1-3 illustrate an embodiment of a window assembly 10 that includes a power transfer assembly 11. Specifically, FIG. 1 illustrates a partial schematic front view of the window assembly 10 including the power transfer assembly 11. FIG. 2 illustrates a partial schematic front view of the window assembly 10 of FIG. 1 showing a raised and tilted window sash 14. And, FIG. 3 illustrates a partial schematic side view of the window assembly 10 of FIG. 2. As will be described further, in some examples, the window assembly 10 can include a powered component, such as a movable privacy glazing structure, and power transfer assembly 11 can be configured to supply power from an energy source to the movable privacy glazing structure.

As shown at FIGS. 1-3, the window assembly 10 can include an upper sash 12, a lower sash 14, a pair of window jambs 16, a window sill 18, and one or more (e.g., two) window balance assemblies 20. In the particular embodiment illustrated, the upper sash 12 is fixed relative to the window sill 18 (i.e., in a single hung window assembly). However, other embodiments within the scope of the present disclosure, the upper sash 12 can be movable relative to the window sill 18 between a raised, or closed, position and a lowered, or open, position (i.e., in a double hung window assembly). In the illustrated embodiment, the lower sash 14 can be raised and lowered, between open and closed positions, relative to the window sill 18. The movable lower sash 14 can be connected to the one or more window balance assemblies 20 which can assist a user in opening the lower sash 14 as well as maintain the lower sash 14 in a desired position relative to the window sill 18.

The movable lower sash 14 can include a pair of pivot bars 22 and a pair of tilt latch mechanisms 24. The pivot bars 22 can extend laterally outward in opposing directions, such as from a lower portion of the lower sash 14. Each pivot bar 22 can engage a corresponding window balance assembly 20. The tilt latch mechanisms 24 can extend laterally outward in opposing directions, such as from an upper portion of the lower sash 14, and may selectively engage corresponding ones of the window jambs 16. As shown in FIGS. 2 and 3, the tilt latch mechanisms 24 may be selectively actuated to allow the lower sash 12 to pivot about the pivot bars 22 relative to the window jambs 16 to facilitate cleaning of an exterior side of the window assembly 10 and to allow separation of the lower sash 12 from the window assembly 10, for example.

It will be appreciated that in a double hung window (i.e. where each of the upper sash 12 and the lower sash 14 are movable), the upper sash 12 can also be connected to two or more window balance assemblies to assist the user in opening the upper sash 12 and maintaining the upper sash 12 in a selected position relative to the window sill 18. In such a window assembly, the upper sash 12 can also include tilt latches and pivot bars to allow the upper sash 12 to pivot relative to the window jambs 16 in a similar manner as described previously for the lower sash 14.

Each of the window jambs 16 can include a jamb channel 26 that is defined by a first wall 28, a second wall 30 that is opposite the first wall 28, a third wall 32 that extends between and is disposed perpendicular to the first and second walls 28, 30, and a fourth wall 34 that extends between and is disposed perpendicular to the first and second walls 28, 30. The first wall 28 can include a vertically extending slot defined thereat and adjacent a movable portion of the window assembly 10 (e.g., the lower sash 14). As illustrated, the window balance assembly 20 can be installed within the jamb channel 26. The pivot bar 22 can extend through the vertically extending slot and into the jamb channel 26 to engage (e.g., within the jamb channel 26) the window balance assembly 20. The tilt latch mechanism 24 can selectively engage the slot to lock the lower sash 14 in an upright position, as shown, for example, in FIG. 1.

The window balance assembly 20 can include a carrier 40, a curl spring 42, and a mounting bracket 44. As schematically illustrated in FIGS. 1-3, the carrier 40 (sometimes also referred to as a shoe) can engage the movable lower sash 14 via the pivot bar 22 and house a curled portion 45 of the curl spring 42. The carrier 40 can be movable vertically within the jamb channel 26. The mounting bracket 44 can be fixed (e.g., within the jamb channel 26, such as at one or more of the walls 28, 30, 32, 34 defining the jamb channel 26) relative to the window jamb 16. The mounting bracket 44 can engage an uncurled end portion 47 of the curl spring 42. The curl spring 42 may resist being uncurled such that the curl spring 42 exerts an upward force on the carrier 40, thereby biasing the movable lower sash 14 toward the open, raised position.

Figure 4:
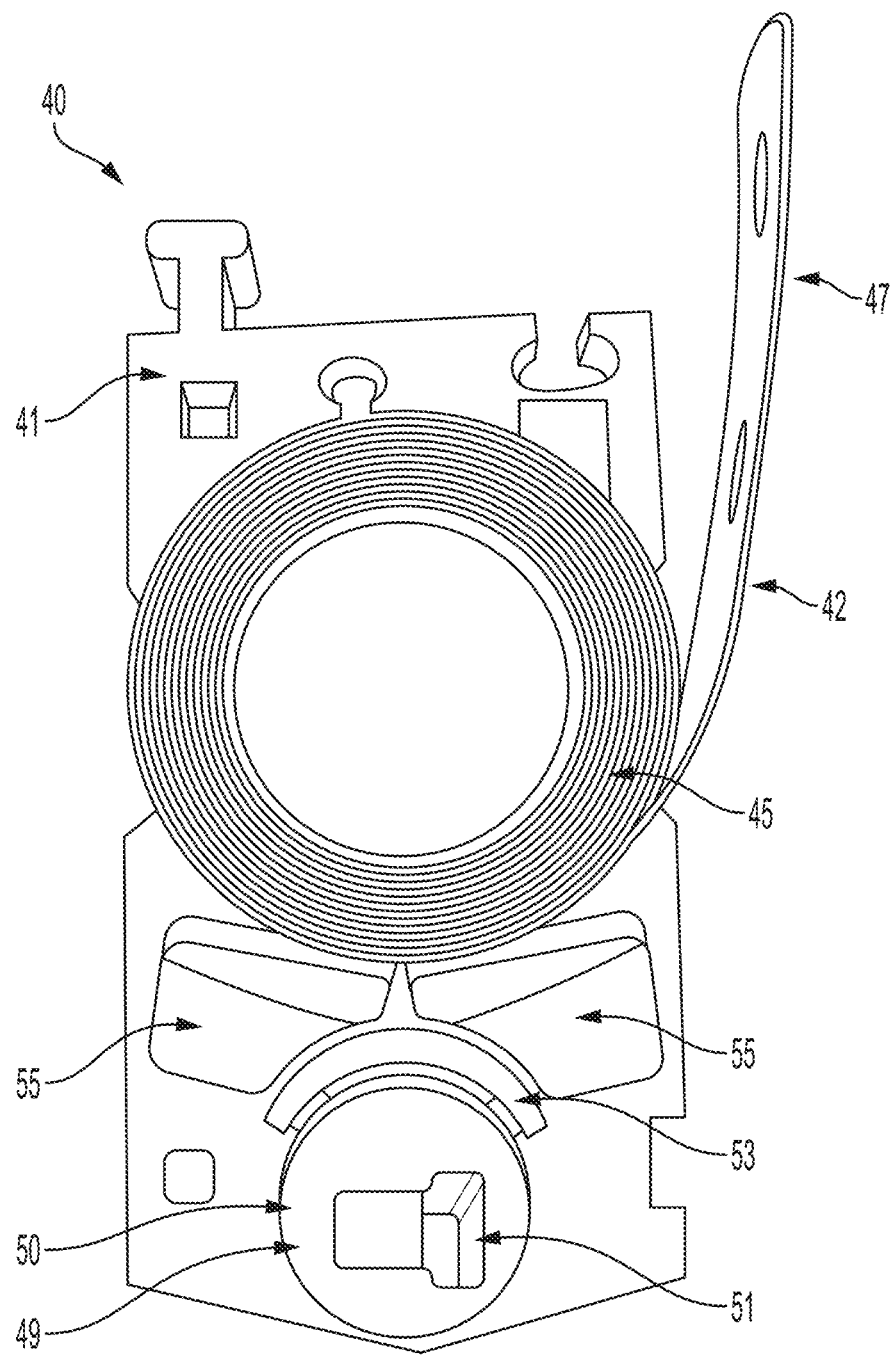
FIG. 4 is an elevational view of an embodiment of a window balance assembly carrier with a portion of the carrier housing removed to show an interior of the carrier.

FIG. 4 illustrates an elevational view of the window balance assembly carrier 40 with a portion of the carrier housing 41 removed to show an interior of the carrier 40. In addition to housing the curled portion 45 of the curl spring 42 (e.g., a coil spring), the carrier 40 can include a receiver 50, a receiver busing 53, and one or more contacts 55. Each of the receiver 50 (e.g., the body 49), receiver bushing 53, one or more contacts 55, and curl spring 42 can include a conductive material such that the receiver 50, bushing 53, one or more contacts 55, and curl spring 42 can form an electrically conductive pathway. For example, the receiver 50 can be in contact with the bushing 53, the bushing 53 can be in contact with one or more of the contacts 55, and one or more of the contacts 55 can be in contact with the curl spring 42 (e.g., in contact with the curled portion 45). In this way, electrical potential can pass between the conductive receiver 50, conductive bushing 53, one or more conductive contacts 55, and conductive curl spring 42. In some embodiments, to facilitate this electrically conductive pathway as the carrier 40 moves in operation, the carrier 40 can further include one or more biasing members (e.g., one or more springs) configured to apply a biasing force at the one or more contacts 55 to urge the one or more contacts 55 toward the curl spring 42. This can help maintain contact between the one or more contacts 55 and the curl spring 42 as the curl spring 42 is drawn out of the carrier housing 41 as a result of movement of the carrier 40.

The receiver 50 includes a body 49 that can define a first complementary fitting 51. In the illustrated embodiment, the first complementary fitting 51 is a slot defined by the body 49, though in other embodiments the first complementary fitting 51 can be configured in other suitable manners. The first complementary fitting 51 can be configured to couple to the pivot bar 22. In particular, the pivot bar 22 can include a second complementary fitting 23 (shown at, e.g., FIG. 5) that is configured to couple to the first complementary fitting 51 of the receiver 50 so as to engage the pivot bar 22 at the carrier 40.

The receiver 50 can be rotatable relative to the carrier housing 41, for instance between a locked position and an unlocked position. More specifically, the pivot bar 22 can rotatably couple to the receiver 50 so as to allow the movable lower sash 14 to pivot about the pivot bar 22 between an upright position and a tilted position as shown in FIGS. 2 and 3. As such, as the movable lower sash 14 pivots about the pivot bar 22, the pivot bar 22 can rotate the receiver 50 between the locked and unlocked positions. Notably, the configuration of the receiver 50, bushing 53, one or more contacts 55, and curl spring 42 can maintain the electrically conductive pathway therebetween when the receiver 50 rotates and is in both the locked position and the unlocked position.

For example, the rotational position of the receiver 50, as shown in FIG. 4, can be the unlocked position where the first complementary fitting 51 can be oriented generally horizontally, and the receiver 50 can rotate (e.g., ninety degrees) relative to the carrier housing 41, as a result of torque applied by the pivot bar 22, to the locked position where the first complementary fitting 51 can be oriented generally vertical. When the receiver 50 is in the unlocked position, the carrier 40 can be configured to move (e.g., upward and downward) relative to the window jamb 16 (e.g., move within the jamb channel 26) as the lower sash 14 moves between the open and closed positions. When the lower sash 14 is tilted relative to the window jamb 16 in the direction of arrow A shown in FIG. 3, the pivot bar 22 can rotate the receiver 50 toward the locked position. When the receiver 50 is in the locked position, the carrier 40 can be held in place relative to the window jamb (e.g., held in place within the jamb channel 26). For example, the receiver 50 can include a first locking fitting that creates an interference fit with a complementary, second locking fitting at the carrier housing 41 when the receiver 50 is rotated to the locked position. Accordingly, when the lower sash 14 is in a tilted position, the window balance assembly 20 may be prevented from exerting a net upward force on the lower sash 14. With the carrier 40 held in place within the jamb channel 26 as a result of rotating the receiver 50 to the locked position, the lower sash 14 can be easily removed from the window assembly 10, for instance, for maintenance or replacement.

Figure 5:
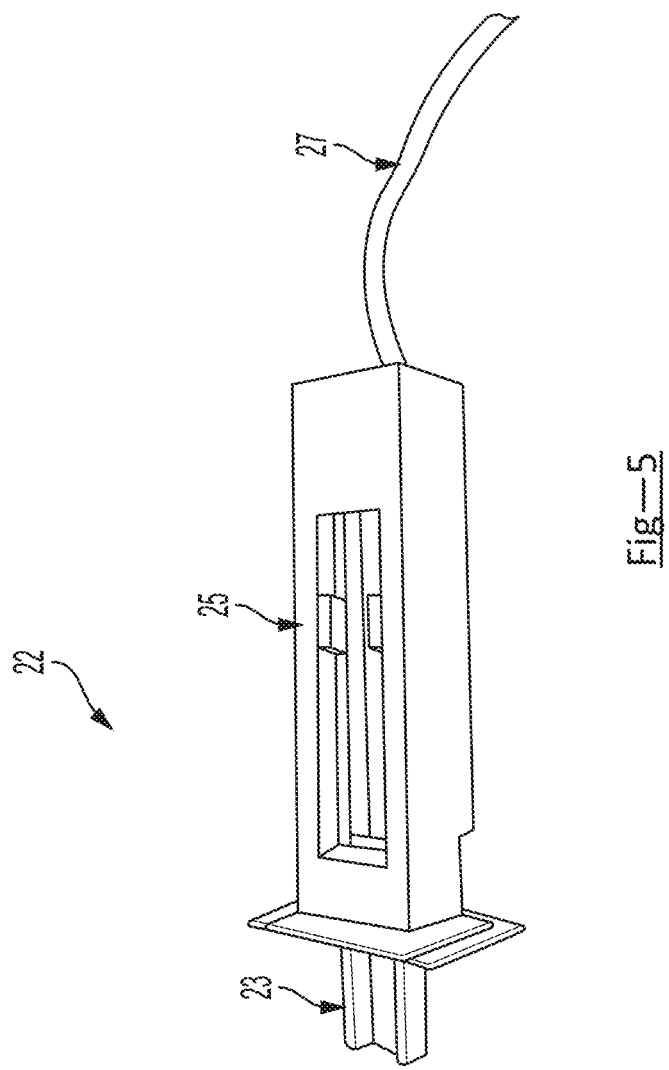
FIG. 5 is a perspective view of an embodiment of a pivot bar.

FIG. 5 is a perspective view of the pivot bar 22. As noted, the pivot bar 22 can include the second complementary fitting 23. In the illustrated embodiment, where the first complementary fitting 51 is a slot defined by the body 49, the second complementary fitting 23 can be an arm that extends out from a body 25 of the pivot bar 22. This arm forming the second complementary fitting 23 in the illustrated embodiment can extend into the slot forming the first complementary fitting 51 to thereby rotatably couple the pivot bar 22 to the receiver 50.

The pivot bar 22 can include a conductive material and form part of the electrically conductive pathway. In particular, both the body 25 and the second complementary fitting 23 of the pivot bar 22 can include a conductive material. The conductive material of the second complementary fitting 23 can contact the conductive material of the first complementary fitting 51 at the receiver 50. As such, the electrically conductive pathway can extend from the receiver 50 to the pivot bar 22 such that electrical potential can pass between the conductive curl spring 42, the one or more conductive contacts 55, the conductive bushing 53, the conductive receiver 50, the conductive second complementary fitting 23, and the conductive body 25. The pivot bar 22 can further include a conductive line 27 (e.g., an insulated electrical wire) that can also form part of the electrically conductive pathway. As part of the electrically conductive pathway, the conductive line 27 can pass electrical potential between the pivot bar 22 (e.g., the conductive body 25) and a powered component 15.

Referring to FIGS. 1-5, the power transfer assembly 11 can be configured to receive power from an energy source 13 and convey this received power to the powered component 15. The power transfer assembly can include an electrically conductive pathway between the window balance assembly 20, the pivot bar 22, and the powered component 15. More specifically, the power transfer assembly 11 can include an electrically conductive pathway formed by, and between, the conductive curl spring 42, the one or more conductive contacts 55, the conductive bushing 53, the conductive receiver 50, the pivot bar 22 (e.g., the conductive second complementary fitting 23 and the conductive body 25), and the powered component 15. It is noted that, in other embodiments, the power transfer assembly 11 can also be incorporated into the window assembly 10 using other types of window balance assemblies. Namely, while the illustrated embodiment shows a spring-type window balance assembly 20, in other embodiments, the power transfer assembly 11 can also be incorporated into the window assembly 10 using non-spring-type window balance assemblies, for example incorporating the power transfer assembly 11 into the window assembly 10 using a string-type window balance assembly, for instance, where one or more conductive strings of the string-type window balance assembly take the place of the conductive curl spring.

Independent of the specific configuration of the power transfer assembly, the power transfer assembly may include an electrically conductive member that extends and retracts as the movable window element is moved by a user to maintain electrical contact between the movable window element and power source. For example, when power transfer assembly 11 includes a spring (e.g., coil spring 42), the spring may be formed of an electrically conductive metal material (e.g., steel, copper). In some examples, the external surface of the electrically conductive member is coated with an insulator material (e.g., a substantially non-conductive polymeric material). For example, curl spring 42 may be coated with a polymeric material along its length to define two opposite conductive terminal ends and a conductive core (e.g., providing a biasing spring force) surrounded by an insulating material. As a result, when the spring retracts, the insulative outer surfaces of the spring may contact each other (e.g., roll up on each other) rather than having exposed metal surfaces contact each other.

Further, while power transfer assembly 11 has generally been described as an assembly both electrically coupling a power source to a movable window portion and mechanically coupling the movable window portion to the surrounding frame (e.g., to counterbalance the window and hold the window in an open position), in some examples, power transfer assembly 11 is configured to provide electrical coupling without substantially mechanically balancing the window. In these examples, a separate mechanical balancer, such as a traditional balancer, may or may not be utilized in addition to power transfer assembly 11

For example, when power transfer assembly 11 is implemented as a coil spring balancer, the assembly may include a single coil spring 42 or may include multiple coil springs (e.g., two, three, or more). The multiple coil springs may be arranged in series, e.g., by stacking one on top of another. In some examples, one of the multiple coil springs is configured as an electrical conductor to transfer power from a power source to an electrically controllable optically active material carried by a movable window element. One or the other multiple coil spring may be configured to mechanically balance the movable window element, e.g., by being physically but not electrically connected to the movable window element. Other combinations of electrified and/or non-electrified members that can be compressed, extended, and/or coiled to facilitate electrical coupling and/or mechanical balancing of a movable window element relative to a fixed frame can be used.

In some embodiments, such as that illustrated, the power transfer assembly 11 can further include a conductive line 17 (e.g., an electrically conductive wire coated with an insulator) that electrically connects the energy source 13 to the conductive curl spring 42. For example, an aperture 19 can be formed in the window jamb 16 so that the conductive line 17 can pass through the window jamb 16 and facilitate an electrical connection to the curl spring 42 within the jamb channel 26. In one example, the conductive line 17 can electrically connect to the curl spring 42 at the mounting bracket 44. Thus, the conductive line 17 can electrically connect to a fixed portion of the window balance assembly 20 (e.g., the fixed mounting bracket 44 and fixed uncurled end portion 47).

Moreover, by using the curl spring 42 of the carrier 40 as part of the electrically conductive pathway, the curl spring can extend (unroll) and contract (roll up) as the window moved, e.g., adding or removing slack in the electrically conductive pathway to accommodate movement of the lower sash 14 relative to the window jamb 16. Namely, since the curl spring 42 and its curled portion 45 can form part of the conductive path, the slack provided by the curled portion 45 at the carrier 40 can allow the conductive path to be formed without obstructing the function of the window balance assembly 20 to facilitate movement of the lower sash 14.

Thus, the power transfer assembly 11 can be configured to receive power from the energy source 13 and convey this received power to the powered component 15 via the electrically conductive pathway formed by the power transfer assembly 11. As noted, in various embodiments, the power transfer assembly 11 can form this electrically conductive pathway via the conductive line 17, window balance assembly 20, pivot bar 22, and conductive line 27. In many such embodiments, the electrically conductive pathway formed by the power transfer assembly 11 can include both one or more conductive elements of the fixed portion of the window balance assembly 20 and one or more conductive elements of the movable portion of the window balance assembly 20. Conductive elements of the fixed portion of the window balance assembly 20 included as part of the electrically conductive pathway formed by the power transfer assembly 11 can include the fixed, conductive uncurled end portion 47, and, in some further embodiments also the fixed, conductive mounting bracket 44. The movable portion of the window balance assembly 20 included as part of the electrically conductive pathway formed by the power transfer assembly 11 can include conductive elements of the carrier 40, for instance the conductive curled portion 45, the one or more conductive contacts 55, the conductive bushing 53, and the conductive receiver 50 of the movable carrier 40.

As such, in the illustrated embodiment, the power transfer assembly 11 can form the electrically conductive pathway via the conductive line 17, the conductive curl spring 42 (in some cases electrically connected to the conductive line 17 via the fixed, conductive mounting bracket 44), the one or more conductive contacts 55, the conductive bushing 53, the conductive receiver 50, the pivot bar 22, and the conductive line 27. In one exemplary arrangement of the power transfer assembly 11, the electrically conductive pathway is formed, at least in part, via contact between the conductive curl portion 45 of the curl spring 42 and one or more conductive contacts 55, contact between one or more conductive contacts 55 and conductive bushing 53, contact between conductive bushing 53 and conductive receiver 50, contact between conductive first complementary fitting 51 of receiver 50 and conductive second complementary fitting 23 of pivot bar 22, contact between body 25 of pivot bar 22 and conductive line 27, and contact between conductive line 27 and powered component 15.

As described, the disclosed embodiments can convey electrical potential between the energy source 13 and the powered component 15 via the power transfer assembly 11. The energy source 13 can be, for example, a battery or mains or wall power supplied through a circuit breaker, and the energy source 13 can supply power to the power transfer assembly 11. If a battery is used, the battery may be positioned in a portion of the fixed frame surrounding the movable sash of the window and/or outside of the frame. If a continuous power source is used (e.g., wall power), power transfer assembly 11 may electrically connect to the power source through an opening created in the fixed frame.

In some examples, a driver is positioned between the power source and powered component to condition the power received from the source and to supply the conditioned power to the power transfer assembly. When used, the driver may change one or more characteristics of the power received from the power source (e.g., change voltage, amplitude, waveform, frequency, convert from alternating to direct current).

The powered component 15 can be associated with the window assembly 10, for instance associated with the window sashes 12 and/or 14, and the powered component 15 can take a variety of forms in various embodiments. For example, in some embodiments, the powered component 15, which receives power via the power transfer assembly 11, can include an electrically controllable optically active material, for instance at the window sash 14. The following describes embodiments of the electrically controllable optically active material that can receive power from the power transfer assembly 11, for instance via electrical connection between the conductive line 27 and the electrically controllable optically active material.

Figure 6:
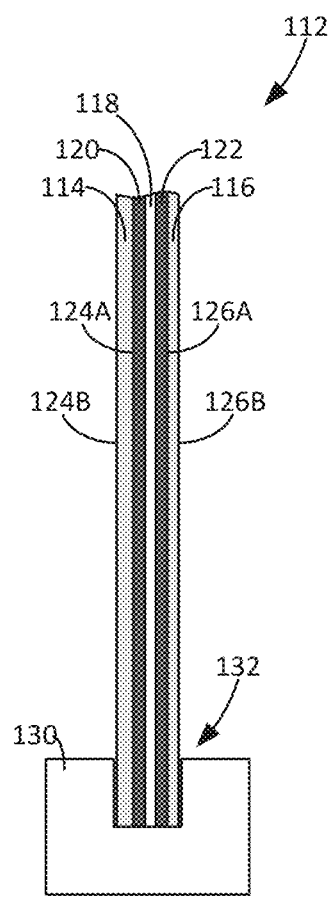
FIG. 6 is a side view of an example privacy glazing structure that can be the powered component for receiving power from the power transfer assembly in some embodiments.

FIG. 6 is a side view of an example privacy glazing structure 112. In some embodiments, the privacy glazing structure 112 can be the powered component 15 associated with the window assembly 10, and, thus, the privacy glazing structure 112 can receive power from the power transfer assembly 11.

The privacy glazing structure 112 can include a first pane of transparent material 114 and a second pane of transparent material 116 with a layer of optically active material 118 bounded between the two panes of transparent material. The privacy glazing structure 112 also includes a first electrode layer 120 and a second electrode layer 122. The first electrode layer 120 is carried by the first pane of transparent material 114 while the second electrode layer 122 is carried by the second pane of transparent material. In operation, electricity supplied through the first and second electrode layers 120, 122 via a driver as described herein can control the optically active material 118 to control visibility through the privacy glazing structure.

Privacy glazing structure 112 can utilize any suitable privacy materials for the layer of optically active material 118. Further, although optically active material 118 is generally illustrated and described as being a single layer of material, it should be appreciated that a structure in accordance with the disclosure can have one or more layers of optically active material with the same or varying thicknesses. In general, optically active material 118 is configured to provide controllable and reversible optical obscuring and lightening. Optically active material 118 can be an electronically controllable optically active material that changes direct visible transmittance in response to changes in electrical energy applied to the material.

In one example, optically active material 118 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 118 is formed of a liquid crystal material. Different types of liquid crystal materials that can be used as optically active material 118 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 120 and 122. When the electric field is off, the liquid crystals may be randomly scattered. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but opaque and scattering upon application of an electric field.

In one example in which the layer of optically active material 118 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 118, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 112 from clearly observing activity occurring on the opposite side of the structure.

When optically active material 118 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 118 may contain spacer beads (e.g., micro-spheres), for example having an average diameter ranging from 3 micrometers to 40 micrometers, to maintain separation between the first pane of transparent material 114 and the second pane of transparent material 116.

In another example in which the layer of optically active material 118 is implemented using a liquid crystal material, the liquid crystal material turns hazy when transitioned to the privacy state. Such a material may scatter light impinging upon the material to prevent an observer on one side of privacy glazing structure 112 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 118.

Another type of material that can be used as the layer of optically active material 118 is a suspended particle material. Suspended particle materials are typically dark or opaque in a non-activated state but become transparent when a voltage is applied. Other types of electrically controllable optically active materials can be utilized as optically active material 118, and the disclosure is not limited in this respect.

Independent of the specific type of material(s) used for the layer of optically active material 118, the material can change from a light transmissive state in which privacy glazing structure 112 is intended to be transparent to a privacy state in which visibility through the insulating glazing unit is intended to be blocked. Optically active material 118 may exhibit progressively decreasing direct visible transmittance when transitioning from a maximum light transmissive state to a maximum privacy state. Similarly, optically active material 118 may exhibit progressively increasing direct visible transmittance when transitioning from a maximum privacy state to a maximum transmissive state. The speed at which optically active material 118 transitions from a generally transparent transmission state to a generally opaque privacy state may be dictated by a variety of factors, including the specific type of material selected for optically active material 118, the temperature of the material, the electrical voltage applied to the material, and the like.

To electrically control optically active material 118, privacy glazing structure 112 in the example of FIG. 6 includes first electrode layer 120 and second electrode layer 122. Each electrode layer may be in the form of an electrically conductive coating deposited on or over the surface of each respective pane facing the optically active material 118. For example, first pane of transparent material 114 may define an inner surface 124A and an outer surface 124B on an opposite side of the pane. Similarly, second pane of transparent material 116 may define an inner surface 126A and an outer surface 126B on an opposite side of the pane. First electrode layer 120 can be deposited over the inner surface 124A of the first pane, while second electrode layer 122 can be deposited over the inner surface 126A of the second pane. The first and second electrode layers 120, 122 can be deposited directed on the inner surface of a respective pane or one or more intermediate layers, such as a blocker layer, and be deposited between the inner surface of the pane and the electrode layer.

Each electrode layer 120, 122 may be an electrically conductive coating that is a transparent conductive oxide ("TCO") coating, such as aluminum-doped zinc oxide and/or tin-doped indium oxide. The transparent conductive oxide coatings can be electrically connected to a power source, such as energy source 13 via power transfer assembly 11, through notch structures as described in greater detail below. In some examples, the transparent conductive coatings forming electrode layers 120, 122 define wall surfaces of a cavity between first pane of transparent material 114 and second pane of transparent material 116 which optically active material 118 contacts. In other examples, one or more other coatings may overlay the first and/or second electrode layers 120, 122, such as a dielectric overcoat (e.g., silicon oxynitride). In either case, first pane of transparent material 114 and second pane of transparent material 116, as well as any coatings on inner faces 124A, 126A of the panes can form a cavity or chamber containing optically active material 118.

The panes of transparent material forming privacy glazing structure 112, including first pane 114 and second pane 116, can be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 112 are formed of glass. In other examples, at least one (and optionally all) the privacy glazing structure 112 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 114 and/or second pane 116 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in US Patent Publication No. 2018/0307111, titled "HIGH PERFORMANCE PRIVACY GLAZING STRUCTURES" and filed Apr. 20, 2018, the entire contents of which are incorporated herein by reference.

Privacy glazing structure 112 can be used in any desired application, including in a door, a window, a wall (e.g., wall partition), a skylight in a residential or commercial building, or in other applications. As one specific example, privacy glazing structure 112 can be used at the window assembly, for instance pane surrounded by window sash 14, described previously herein To help facilitate installation of privacy glazing structure 112, the structure may include a frame 130 surrounding the exterior perimeter of the structure. This frame 130 can form the window jamb 16, and associated jamb channel 26, described previously herein. In different examples, frame 130 may be fabricated from wood, metal, or a plastic material such a vinyl. Frame 130 may define a channel 132 that receives and holds the external perimeter edge of structure 112.

Figure 7:
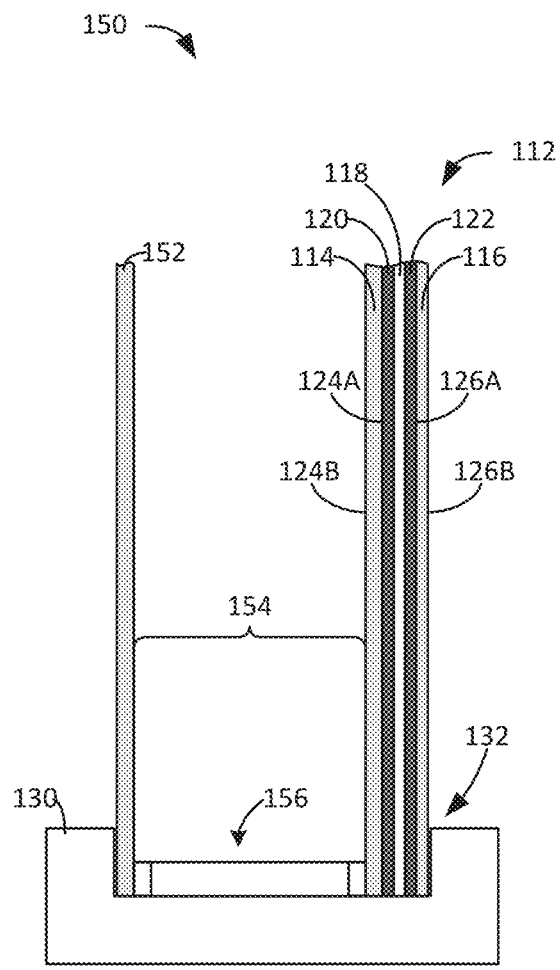
FIG. 7 is a side view of the example privacy glazing structure of FIG. 6 incorporated into a multi-pane insulating glazing unit.

In the example of FIG. 6, privacy glazing structure 112 is illustrated as a privacy cell formed of two panes of transparent material bounding optically active material 118. In other configurations, privacy glazing structure 112 may be incorporated into a multi-pane glazing structure that include a privacy cell having one or more additional panes separated by one or more between-pane spaces. FIG. 7 is a side view of an example configuration in which privacy glazing structure 112 from FIG. 6 is incorporated into a multi-pane insulating glazing unit having a between-pane space.

As shown in the illustrated example of FIG. 7, a multi-pane privacy glazing structure 150 may include privacy glazing structure 112 separated from an additional (e.g., third) pane of transparent material 152 by a between-pane space 154, for example, by a spacer 156. Spacer 156 may extend around the entire perimeter of multi-pane privacy glazing structure 150 to hermetically seal the between-pane space 154 from gas exchange with a surrounding environment. To minimize thermal exchange across multi-pane privacy glazing structure 150, between-pane space 154 can be filled with an insulative gas or even evacuated of gas. For example, between-pane space 154 may be filled with an insulative gas such as argon, krypton, or xenon. In such applications, the insulative gas may be mixed with dry air to provide a desired ratio of air to insulative gas, such as ten percent air and ninety percent insulative gas. In other examples, between-pane space 154 may be evacuated so that the between-pane space is at vacuum pressure relative to the pressure of an environment surrounding multi-pane privacy glazing structure 150.

Spacer 156 can be any structure that holds opposed substrates in a spaced apart relationship over the service life of multi-pane privacy glazing structure 150 and seals between-pane space 154 between the opposed panes of material, e.g., so as to inhibit or eliminate gas exchange between the between-pane space and an environment surrounding the unit. One example of a spacer that can be used as spacer 156 is a tubular spacer positioned between first pane of transparent material 114 and third pane of transparent material 152. The tubular spacer may define a hollow lumen or tube which, in some examples, is filled with desiccant. The tubular spacer may have a first side surface adhered (by a first bead of sealant) to the outer surface 124B of first pane of transparent material 114 and a second side surface adhered (by a second bead of sealant) to third pane of transparent material 152. A top surface of the tubular spacer can be exposed to between-pane space 154 and, in some examples, includes openings that allow gas within the between-pane space to communicate with desiccating material inside of the spacer. Such a spacer can be fabricated from aluminum, stainless steel, a thermoplastic, or any other suitable material.

Another example of a spacer that can be used as spacer 156 is a spacer formed from a corrugated metal reinforcing sheet surrounded by a sealant composition. The corrugated metal reinforcing sheet may be a rigid structural component that holds first pane of transparent material 114 apart from third pane of transparent material 152. In yet another example, spacer 156 may be formed from a foam material surrounded on all sides except a side facing a between-pane space with a metal foil. As another example, spacer 156 may be a thermoplastic spacer (TPS) spacer formed by positioning a primary sealant (e.g., adhesive) between first pane of transparent material 114 and third pane of transparent material 152 followed, optionally, by a secondary sealant applied around the perimeter defined between the substrates and the primary sealant. Spacer 156 can have other configurations, as will be appreciated by those of ordinary skill in the art.

Depending on application, first pane of transparent material 114, second pane of transparent material 116, and/or third pane of transparent material 152 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. A photocatalytic coating, by contrast, may be a coating that includes a photocatalyst, such as titanium dioxide. In use, the photocatalyst may exhibit photoactivity that can help self-clean, or provide less maintenance for, the panes.

The electrode layers 120, 122 of privacy glazing structure 112, whether implemented alone or in the form of multiple-pane structure with a between-pane space, can be electrically connected to a driver. The driver can provide a drive signal to the electrode layers, which may be electrical signal of a define current, voltage, and waveform to control optically active material 118.

FIG. 8 is a schematic illustration showing an example connection arrangement between the conductive line 27 and a driver 160 as well as between the driver 160 and electrode layers of a privacy structure. In the illustrated example, wires 140 and 142 electrically couple driver 160 to the first electrode layer 120 and the second electrode layer 122, respectively. In some examples, wire 140 and/or wire 142 may connect to their respective electrode layers via a conduit or hole in the transparent pane adjacent the electrode layer. In other configurations, wire 140 and/or wire 142 may contact their respective electrode layers at the edge of the privacy structure 112 without requiring wire 140 and/or wire 142 to extend through other sections (e.g., transparent panes 114, 116) to reach the respective electrode layer(s). In either case, driver 160 may be electrically coupled to each of electrode layers 120 and 122.

In operation, the driver 160 can apply a voltage difference between electrode layers 120 and 122, resulting in an electric field across optically active material 118. The optical properties of the optically active material 118 can be adjusted by applying a voltage across the layer. In some embodiments, the effect of the voltage on the optically active material 118 is independent of the polarity of the applied voltage. For example, in some examples in which optically active material 118 comprises liquid crystals that align with an electric field between electrode layers 120 and 122, the optical result of the crystal alignment is independent of the polarity of the electric field. For instance, liquid crystals may align with an electric field in a first polarity, and may rotate approximately 180° in the event the polarity if reversed. However, the optical state of the liquid crystals (e.g., the opacity) in either orientation may be approximately the same.

In embodiments where the powered component 15 is the privacy structure 112, the power transfer assembly 11 can be electrically connected to one or more electrode layers (e.g., electrode layers 120 and/or 122) of the privacy structure 112. As such, the one or more electrode layers can receive power from the energy source 13 via the power transfer assembly 11. As illustrated at FIG. 8, the conductive line 27 of the power transfer assembly 11 can be electrically connected to the one or more electrode layers 120, 122. In particular, in the illustrated embodiment, the conductive line is electrically connected to the one or more electrode layers 120, 122 via the driver 160. As such, in this illustrated embodiment, the power transfer assembly 11 is electrically connected to the driver 160 to thereby electrically connect the driver 160 to the energy source 13. The driver 160 can receive power from the energy source 13 via the power transfer assembly 11 and process this received power to provide a drive signal delivered to privacy structure 112 via wires 140, 142.

The characteristics of the electricity delivered by energy source 13 via power transfer assembly 11 can vary depending on the application and the specific source of power used. In some applications, energy source 13 delivers electricity at a voltage ranging from 50 V to 500 V, such as from 100 V to 250 V, or from 110 V to 130 V. For example, energy source 13 may supply electricity at a voltage of approximately 120 V (e.g., plus or minus 5%). The apparent power supplied by energy source 13 is a function of both the voltage and current of the electricity delivered to driver 160. In some examples, energy source 13 delivers electricity having apparent power ranging from 1000 VA to 5000 VA, such as from 1500 VA to 2500 VA. For example, driver 160 may receive power from energy source 13 via power transfer assembly 11 having an apparent power of at least 1500 VA, such as at least 1650 VA, or at least 1750 VA.

In implementations where driver 160 (e.g., conditioning circuitry of the driver) includes a controller, the controller can include one or more components configured to process received information, such as a received input from a user interface, and perform one or more corresponding actions in response thereto. Such components can include, for example, one or more application specific integrated circuits (ASICs), microcontrollers, microprocessors, field-programmable gate arrays (FPGAs), or other appropriate components capable of receiving and output data and/or signals according to a predefined relationship. In some examples, such one or more components can be physically integrated with the other driver components, such as a switching network and the like.

In some examples, the controller operates in response to a signal from one or more controls that function as a user interface with the controller. The one or more controls may provide a command to change the optical state of the optically active material. In various examples, the one or more controls can be a switch or other component in wired or wireless communication with the controller. For instance, a hard switch (e.g., a wall switch proximate an optically dynamic structure) can be coupled to the controller and can switch between two or more switching states, each corresponding to an optical state of the optically active material. Additionally or alternatively, the driver may be configured to communicate with an external component, such as a smartphone or tablet via wireless communication or an internet-connected device (e.g., through a hard-wired or wireless network connection). In some implementations, the controller can receive a signal from such an external device corresponding to a desired optical state of the optically active material and can control the optically active material accordingly, e.g., to transition to that state.

The foregoing description has focused on a power transfer assembly that is generally configured as an electrified balancer. A power transfer assembly can have a variety of other configurations. FIGS. 9A and 9B illustrate an example of a different type of power transfer assembly. In particular, FIGS. 9A and 9B illustrate an embodiment of a roller 200 that can be used as part of a power transfer assembly. For example, the roller 200 can be used as part of a power transfer assembly for conveying power to a powered component associated with a sliding glass door or in other applications to convey power to a powered component associated with a glass assembly where that glass assembly does not have a balancer assembly. FIG. 9A is a schematic, perspective view of the roller 200, and FIG. 9B is a perspective view of the roller 200 in isolation and with the housing removed.

The roller 200 can include a support shaft 205, a roller body 210, and a wheel 215. The support shaft 205 can be coupled to the roller body 210 at one end portion and coupled to a support surface at another, opposite end portion, and the support shaft 205 can be configured to support the roller 200 during operation. The support shaft 205 can be rotatably coupled to the roller body 210 such that the roller body 210 can be configured to rotate about the support shaft 205 (e.g., rotate 360 degrees about the support shaft). The support shaft 205 can include a spring element 206 to facilitate up/down movement of the roller body 210 so to thereby accommodate non-liner travel of the roller 200. Also coupled to the roller body 210 is the wheel 215. The wheel 215 can be rotatably coupled to the roller body 210 via axle 216 such that wheel 215 rotates about axle 216 to move roller 200 along an electrically conductive track 220. As shown in the illustrated embodiment, the body 210 is in the form of a "C-shape" body, and the wheel 215 and support shaft 205 are coupled to the roller body 210 at opposite end sides of the "C-shape" body.

The roller 200 can include a first housing 201 and a second housing 202 to help isolate the components of the roller 200 interior to the housings 201, 202. The first housing 201 and the second housing 202 can be secured at the roller 200 so as to be movable relative to one another. Independently movable housings 201, 202 can be useful to accommodate the independent movement of the support shaft 205 and the roller body 210.

As noted, the roller 200 can be used as part of a power transfer assembly 201 for conveying power to a powered component (e.g., an electrically controllable optically active component) associated with a glass structure, such as a sliding glass door. The body 210 and the wheel 215 can include a conductive material. The energy source 113 can be electrically connected to the track 220 such that as the conductive wheel 215 contacts the electrically conductive track 220 electrical energy is conveyed from the track 220 to the conductive wheel 215. The conductive wheel 215 can be electrically connected to the roller body 210 so as to convey the electrical energy from the wheel 215 to the roller body 210. A conductive line 227 can be electrically connected to the roller body 210 so as to receive the electrical energy from the roller body, and the conductive line 227 can be electrically connected at an opposite end to the powered component associated with the glass structure.

In some embodiments, such as that illustrated here, the roller 200 can further include one or more conductive biasing members 225. The conductive biasing member 225 can be configured to help transfer electrical energy from the wheel 215 to the roller body 210. As one example, the axle 216 can include a conductive material, and the conductive biasing member 225 can be in electrical connection (e.g., conductive contact) with the wheel 215 and the roller body 210. For instance, the conductive biasing member 225 can be in electrical connection with the wheel 215 via the axle 216, and the conductive biasing member 225 can be configured to contact and apply a biasing force against the conductive axle 216 so as to receive electrical energy from the axle 216 and transfer this electrical energy to the roller body 210.

Thus, the power transfer assembly 201 can form an electrically conductive pathway at the roller 200 so as to receive electrical energy from the track 220 and transfer this received electrical energy to the conductive line 227, and the conductive line 227 can provide the electrical energy to the powered component associated with the glass structure. Namely, the power transfer assembly 201 can form the electrically conductive pathway, at the roller 200, from the wheel 225 to the roller body 210 (e.g., via the axle 216 and/or conductive biasing member 225) and from the roller body 210 to the conductive line 227. The conductive line 227 can be electrically connected to the powered component as described previously herein for the conductive line of the power transfer assembly 11 (e.g., the conductive line 227 of the power transfer assembly 201 can be electrically connected to the electrically controllable optically active material, such as via the driver and/or the one or more electrode layers).

Various examples have been described. These and other examples are within the scope of the following claims.

The invention claimed is:

1. An electrically dynamic system comprising:
a first pane of transparent material;
a second pane of transparent material;
an electrically controllable optically active material positioned between the first pane of transparent material and the second pane of transparent material, the electrically controllable optically active material being positioned between a first electrode layer and a second electrode layer; and
a power transfer assembly comprising:
a window balance assembly including a first portion configured to be fixed in place, relative to at least one of the first pane and the second pane, and a second portion configured to be movable relative to the first portion;
a pivot bar conductively coupled to the second portion of the window balance assembly; and
an electrically conductive pathway between the window balance assembly and at least one of the first electrode layer and the second electrode layer.

2. The system of claim 1, wherein the electrically conductive pathway is between the first portion of the window balance assembly, the second portion of the window balance assembly, the pivot bar, and the at least one of the first electrode layer and the second electrode layer.

3. The system of claim 2, wherein the first portion of the window balance assembly includes an electrically conductive material, wherein the second portion of the window balance assembly includes an electrically conductive material, and wherein the electrically conductive material of the first portion of the window balance assembly is conductively coupled to the electrically conductive material of the second portion of the window balance assembly.

4. The system of claim 3, wherein the electrically conductive material of the second portion of the window balance assembly includes an electrically conductive receiver and one or more electrically conductive contacts, the electrically conductive receiver configured to couple to the pivot bar to conductively couple the pivot bar to the second portion of the window balance assembly, and wherein the one or more electrically conductive contacts are configured to be in electrical connection with the electrically conductive receiver.

5. The system of claim 4, wherein the window balance assembly includes a curl spring having an uncurled end portion and a curled portion, wherein the first portion of the window balance assembly includes the uncurled end portion and the second portion of the window balance assembly includes the curled portion, and wherein the one or more electrically conductive contacts are in conductive contact with the curled portion so as to conductively couple the uncurled end portion to the electrically conductive receiver.

6. The system of claim 1, wherein the power transfer assembly further comprises:
a conductive line including a first end portion and a second end portion that is opposite the first end portion, the first end portion of the conductive line conductively coupled to the pivot bar and the second end portion of the conductive line conductively coupled to the at least one of the first electrode layer and the second electrode layer.

7. The system of claim 6, further comprising:
a driver electrically connected to the first electrode layer, the second electrode layer, and the conductive line,
wherein the driver is configured to:
receive power from the conductive line,
convert the received power to a drive signal, and
provide the drive signal to the first electrode layer and the second electrode layer for controlling the electrically controllable optically active material.

8. The system of claim 1, wherein the electrically conductive pathway between the window balance assembly and the at least one of the first electrode layer and the second electrode layer includes, at the second portion of the window balance assembly, an electrically conductive receiver and one or more electrically conductive contacts, the electrically conductive receiver configured to conductively couple to the pivot bar and rotate with the pivot bar, the one or more electrically conductive contacts configured to conductively couple to each of the first portion of the window balance assembly and the electrically conductive receiver.

9. The system of claim 1, wherein the first pane of transparent material, the second pane of transparent material, and the electrically controllable optically active form a privacy glazing structure, and wherein the privacy glazing structure is movable relative to the first portion of the window balance assembly.

10. The system of claim 1, further comprising:
   a third pane of transparent material; and
   a spacer separating the third pane of transparent material from the second pane of transparent material to define a between-pane space therebetween, the between-pane space being filled with an insulative gas.

11. The system of claim 1, further comprising:
   a sash surrounding a perimeter of at least the first pane of transparent material, the second pane of transparent material, and the electrically controllable optically active; and
   a frame mountable into an opening in a wall, the sash being movable relative to the frame,
   wherein the first portion is operatively connected to the frame and the second portion is operatively to the sash.

12. The system of claim 1, wherein the system is a single-hung window or a double-hung window.

* * * * *